United States Patent
Sisodia et al.

(10) Patent No.: US 10,692,491 B2
(45) Date of Patent: Jun. 23, 2020

(54) METHODS AND SYSTEMS FOR RECIPE MANAGEMENT

(71) Applicant: KONINKLIJKE PHILIPS N.V., Eindhoven (NL)

(72) Inventors: Rajendra Singh Sisodia, Eindhoven (NL); Anand Srinivasan Srinivasan Natesan, Eindhoven (NL); Aravind Gundumane, Eindhoven (NL); Chaitra Bhat, Eindhoven (NL)

(73) Assignee: KONINKLUKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/524,283

(22) PCT Filed: Nov. 4, 2015

(86) PCT No.: PCT/IB2015/058530
§ 371 (c)(1),
(2) Date: May 4, 2017

(87) PCT Pub. No.: WO2016/071854
PCT Pub. Date: May 12, 2016

(65) Prior Publication Data
US 2017/0323640 A1 Nov. 9, 2017

(30) Foreign Application Priority Data
Nov. 5, 2014 (IN) .............................. 5567/CHE/2014

(51) Int. Cl.
*A23L 5/10* (2016.01)
*G10L 15/18* (2013.01)
(Continued)

(52) U.S. Cl.
CPC ................ *G10L 15/22* (2013.01); *A23L 5/10* (2016.08); *G06F 9/451* (2018.02); *G06F 16/40* (2019.01);
(Continued)

(58) Field of Classification Search
CPC ............. G10L 15/18; G10L 15/22; A23L 5/10
See application file for complete search history.

(56) References Cited

U.S. PATENT DOCUMENTS 6,549,818 B1 4/2003 Ali
7,370,034 B2 * 5/2008 Franciosa ........... G06F 16/3334
707/749
(Continued)

FOREIGN PATENT DOCUMENTS

DE 102013204634 A1 9/2014
JP 2008123131 5/2008

*Primary Examiner* — Bryan S Blankenagel (57) ABSTRACT

Systems and methods for obtaining content over the Internet, identifying text within the content (e.g., such as closed captioning or recipe text) or creating text from the content using such technologies as speech recognition, analyzing the text for actionable directions, and translating those actionable directions into instructions suitable for network-connected cooking appliances. Certain embodiments provide additional guidance to avoid or correct mistakes in the cooking process, and allow for the customization of recipes to address, e.g., dietary restrictions, culinary preferences, translation into a foreign language, etc.

23 Claims, 4 Drawing Sheets

(51) Int. Cl.
*G10L 15/22* (2006.01)
*G06F 16/40* (2019.01)
*G06F 16/435* (2019.01)
*G06Q 30/06* (2012.01)
*G06F 40/166* (2020.01)
*G06F 9/451* (2018.01)
*G06Q 30/00* (2012.01)

(52) U.S. Cl.
CPC .......... *G06F 16/435* (2019.01); *G06F 40/166* (2020.01); *G06Q 30/06* (2013.01); *G10L 15/18* (2013.01); *G06Q 30/00* (2013.01); *G10L 2015/223* (2013.01)

(56) References Cited

U.S. PATENT DOCUMENTS

| | | | | |
|---|---|---|---|---|
| 7,890,493 | B2* | 2/2011 | Chen | G06F 16/951 |
| | | | | 707/713 |
| 8,145,854 | B1* | 3/2012 | Lee | G06Q 10/06316 |
| | | | | 711/154 |
| 9,797,873 | B1* | 10/2017 | Feller | G16H 20/60 |
| 2006/0043088 | A1 | 3/2006 | Ancona | |
| 2006/0185523 | A1* | 8/2006 | Wiedemann | A47J 27/62 |
| | | | | 99/331 |
| 2008/0264269 | A1* | 10/2008 | Sterzel | F24C 7/08 |
| | | | | 99/331 |
| 2009/0110592 | A1* | 4/2009 | Lee | A61L 9/22 |
| | | | | 422/5 |
| 2009/0258331 | A1 | 10/2009 | Do | |
| 2013/0011523 | A1* | 1/2013 | Belzowski | A23P 30/00 |
| | | | | 426/89 |
| 2013/0092032 | A1 | 4/2013 | Cafferty | |
| 2013/0149677 | A1* | 6/2013 | Slone | G09B 19/0092 |
| | | | | 434/127 |
| 2014/0249966 | A1* | 9/2014 | Zaragoza | G06Q 30/0635 |
| | | | | 705/26.81 |
| 2014/0272026 | A1* | 9/2014 | Wallace | G06F 13/382 |
| | | | | 426/231 |
| 2014/0272817 | A1* | 9/2014 | Park | G09B 5/02 |
| | | | | 434/127 |

* cited by examiner

METHODS AND SYSTEMS FOR RECIPE MANAGEMENT

This application is the U.S. National Phase application under 35 U.S.C. § 371 of International Application No. PCT/IB2015/058530, filed on Nov. 4, 2015, which claims the benefit of International Application No. 5567/CHE/2014 filed on Nov. 5, 2014. These applications are hereby incorporated by reference herein.

FIELD OF THE INVENTION

The invention relates generally to methods and systems for recipe management, and more specifically to a platform that ingests multimedia content, translates it into machine-executable instructions, and optionally dispatches those instructions and other directions to appliances and other agents to effect the preparation of food.

BACKGROUND OF THE INVENTION

Food preparation traditionally requires a significant amount of manual labor. The preparation of a typical meal may require selecting a cookbook from a shelf of books, identifying a recipe of interest in the selected cookbook, generating a shopping list for the recipe by comparing it against an inventory of ingredients on hand, purchasing the items on the shopping list, preparing the purchased items in preparation for executing the recipe, and executing the recipe utilizing a variety of cooking appliances (e.g., food processor, microwave oven, convection oven, slow cooker, etc.) by compiling specified quantities of ingredients in a specified sequence at one or more temperatures for times of varying duration.

Various parts of the task of food preparation have been automated or are currently subject to efforts to automate them. For example, GOOGLE RECIPE VIEW offered by Google, Inc. of Mountain View, Calif., permits users to search the World-Wide Web for recipe content that utilizes particular ingredients. The embedding of computer processors and network interfaces in household appliances for remote operations over the Internet offers the prospect of automated operation of these devices.

One obstacle to such automation is the difference in skill sets expected of food preparers and appliance programmers. Food preparers are traditionally skilled in following instructions and possibly sharing those instructions with other people having varying levels of skill in food preparation. Programmers are traditionally skilled in software development, packet-based network communications, etc. While programmers may enable the automated operation of various appliances, they may not do so in a user-friendly way that would let food preparers readily take advantage of that functionality.

Accordingly, there is a need for methods and systems that can bridge this gap and thereby provide recipe management.

SUMMARY OF THE INVENTION

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Various embodiments of the invention stem from the observation that there are vast libraries of recipes and food preparation instructions available online in a digital format that are intended for a human audience. Embodiments of the invention translate this content from human-friendly formats to directions that are suited to automated processing. Once translated, these directions can be supplied to a human operator, issued as machine-executable instructions to one or more appliances, or a combination of the two in order to effect the preparation of the food described in the recipe. Embodiments of the invention also allow users to customize the preparation individually or on a global basis by substituting ingredients for reasons of cost, convenience, dietary preference, etc.

In one aspect, the present invention relates to an apparatus for recipe management. The apparatus includes a persistent memory for storage, a network interface configured to receive at least one communication comprising natural language concerning the preparation of food or drink and at least one processor configured to receive from the network interface the at least one communication comprising natural language concerning the preparation of food or drink, extract at least one preparation direction from the at least one received communication, and transform the at least one extracted preparation direction into at least one machine executable instruction.

In one embodiment, the at least one processor is further configured to transmit at least one communication comprising the at least one machine-executable instruction to the network interface, and the network interface is further configured to transmit the at least one communication comprising the at least one machine-executable instruction. In another embodiment, the at least one processor is further configured to receive at least one customization instruction and store said at least one customization instruction in the persistent memory. In certain of those embodiments, the at least one customization instruction is one or more of a dietary requirement and an ingredient substitution.

In one embodiment, the at least one communication comprising natural language comprises spoken language, and the at least one processor is further configured to convert the spoken language to text. In certain of those embodiments, the at least one processor is configured to extract at least one preparation direction from the at least one received communication comprising spoken language using natural language processing.

In one embodiment, the persistent memory comprises information describing the capabilities of at least one appliance and the at least one processor is further configured to compare the at least one extracted preparation direction against the information describing the capabilities of the at least one appliance to identify at least one appliance for preparing food or drink in accordance with the at least one extracted preparation direction. In another embodiment, the apparatus further includes a user interface for providing at least one direction concerning the preparation of food or drink in accordance with the at least one extracted preparation direction. In still another embodiment, the apparatus further includes a user interface for receiving feedback from the user concerning the preparation of food or drink. In yet another embodiment, the persistent memory includes preparation information describing food or drink preparation, and the processor is further configured to use the preparation information to make corrections or adaptations to the at least one extracted preparation direction.

In another aspect, the present invention relates to a method for recipe management. The method includes receiving, via a network interface, at least one electronic communication comprising natural language concerning the preparation of food or drink, automatically extracting, utilizing at least one configured processor, at least one preparation direction from the at least one received communication, and transforming, utilizing the at least one configured processor, the at least one extracted preparation direction into at least one machine executable instruction.

In one embodiment, the at least one processor is further configured to transmit, using the network interface, the at least one machine-executable instruction. In another embodiment, the method further includes receiving at least one customization instruction and storing the at least one customization instruction in a persistent memory. In certain of those embodiments, the at least one customization instruction is one or more of a dietary requirement and an ingredient substitution.

In one embodiment, the at least one electronic communication comprising natural language comprises spoken language, and the method further comprises converting, utilizing the at least one configured processor, the spoken language to text. In certain of those embodiments, the at least one preparation direction is extracted, utilizing the at least one configured processor, from the at least one received communication comprising spoken language using natural language processing.

In one embodiment, the method further comprises comparing the at least one extracted preparation direction against information describing the capabilities of the at least one appliance stored in a persistent memory to identify at least one appliance for preparing food or drink in accordance with the at least one extracted preparation direction. In another embodiment, the method further includes providing, utilizing a user interface, at least one direction concerning the preparation of food or drink in accordance with the at least one extracted preparation direction. In still another embodiment, the method further includes receiving, utilizing a user interface, feedback from the user concerning the preparation of food or drink. In yet another embodiment, the method further includes utilizing preparation information stored in a persistent memory describing food or drink preparation, and the processor is further configured to use the preparation information to make corrections or adaptations to the at least one extracted preparation direction.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

Non-limiting and non-exhaustive embodiments are described with reference to the following figures in which.

In the drawings, like reference characters generally refer to corresponding parts throughout the different views. The drawings are not necessarily to scale, emphasis instead being placed on the principles and concepts of operation.

DETAILED DESCRIPTION OF THE INVENTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are the means used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

In brief overview, various embodiments of the invention provide a next generation recipe management system. Embodiments of the present invention provide systems and methods for obtaining content over the Internet, identifying text within the content (e.g., such as closed captioning or recipe text) or creating text from the content using such technologies as speech recognition, analyzing the text for actionable directions, and translating those actionable directions into instructions suitable for network-connected cooking appliances or directions suitable for a human operator. Certain embodiments provide additional guidance to avoid or correct mistakes in the cooking process and allow for the customization of recipes to address, e.g., dietary restrictions, culinary preferences, translation into a foreign language, etc.

Current approaches require users to manually transcribe the text from online media content and interpret the transcribed text to prepare the recipes. For example, a user may review a video blog, make notes, and review cooking appliance manuals in an attempt to determine the right procedure to prepare the recipe. These current approaches are time-consuming and may require the users to review the original content several times, sometimes while attempting to prepare the recipe. To a certain extent, these approaches also depend on the user's individual expertise with cooking, particular cooking appliances, and preparing similar recipes.

Figure 1:
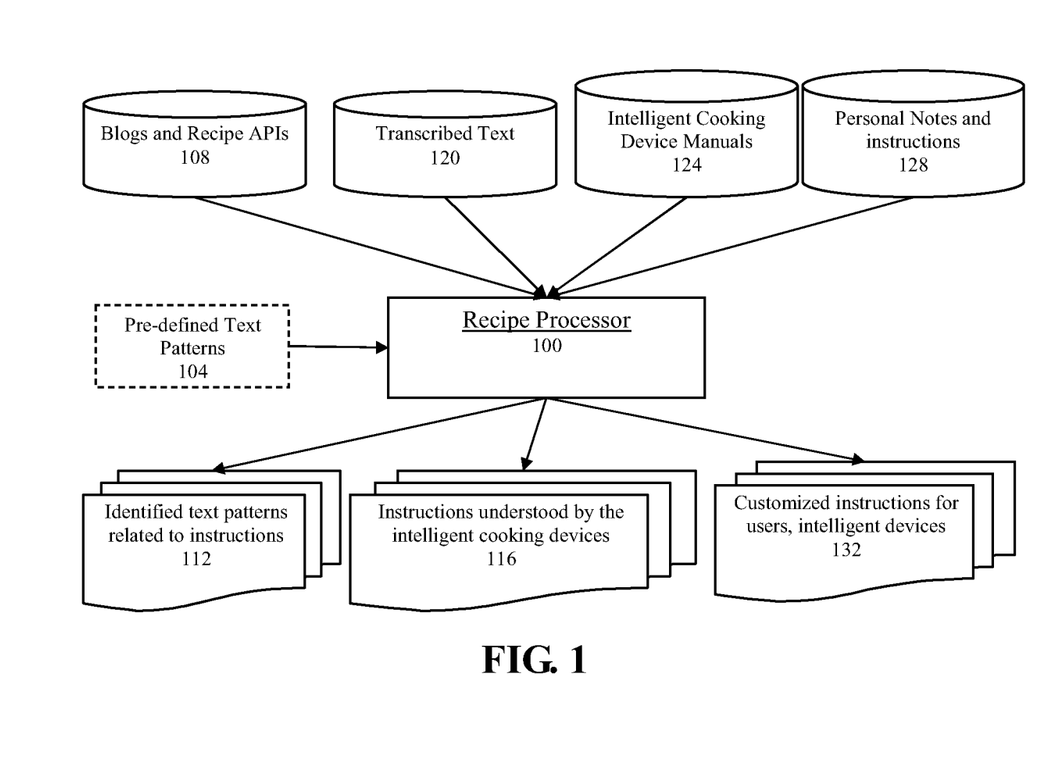
FIG. 1 is a block diagram of an apparatus for recipe management in accord with the present invention.

With reference to FIG. 1, embodiments of the present invention may include a recipe processor 100 that is adapted to extract preparation directions from one or more forms or pieces of content. The processor 100 may be implemented as a program executing on a single computing device such as a personal computer or cellphone, a dedicated computing appliance having the processor 100 implemented in a fixed memory, a program executing across multiple computing devices, etc.

The processor 100 operates by accessing a library of pre-defined text patterns 104 and using those stored patterns to inform its analysis of cooking content in text form. Cooking content is typically natural language addressed to a human audience. An example of such natural language content is, "Break eggs into a cold pan over very low heat and add butter, stirring the eggs frequently until they begin to set; a good six or seven minutes. Add another knob of butter, continue stirring, and then, before completely set, remove the pan from heat, stir in a teaspoon of crème fraiche, and season to taste."

Such natural language content is intended to be parsed by a human reader, and is typically unsuited in its original form for automated processing by automated (a.k.a. "intelligent") cooking appliances. The recipe processor 100 ingests the natural language content and searches the natural language content for text patterns from the library of pre-defined text patterns 104 using natural language processing (NLP) techniques such as verb-phrase extraction and intelligent text parsers. The sequence of the occurrence of the instructions in the text typically indicates the sequence of the occurrence of the preparation directions. Specific patterns such as temperature and quantity of the ingredients are extracted using specific regular expressions curated and stored in a data store.

Each pre-defined pattern may be associated with human-understandable preparation directions and machine-executable instructions to be used in the translation process. For example, one pattern may be "cook over low heat" which is associated with the human-understandable preparation direction, "Turn the burner under the pan to 'low'" and the machine-executable instruction, "Set burner <1> to <2>."

When such a pattern is identified 112, any associated preparation directions and machine-executable instructions 116 are added to a stored memory for later delivery to a user or an intelligent cooking appliance. As discussed below, in one embodiment these items are added to a recipe graph, although other data structures may be used for storing preparation directions and machine-executable instructions.

As discussed above, many items of cooking content are available on the Internet in a variety of forms. Webpages and blog entries in text form 108 may be processed as discussed above. Embodiments of the present invention may also interact with structured sources of recipe content 108' using APIs (application programming interfaces) exposed by those structured sources 108'; certain structured sources 108' may provide the cooking content in the form of preparation directions and/or machine-executable instructions, thereby obviating the need to extract the preparation directions from the cooking content and/or the need to create machine-executable instructions for intelligent cooking appliances.

Items of cooking content available in spoken form may be preprocessed using speech recognition technologies known to the art, such as neural networks, hidden Markov models, and dynamic time warping, resulting in a body of transcribed text 120 that may be processed by the recipe processor 100 as discussed above. Items of video content may also be preprocessed using speech recognition technologies or, in the event that they include closed captioning, the closed captioning text may be processed directly by the recipe processor 100 as discussed above or it may be used to assist the speech recognition process, resulting in transcribed text 120.

The recipe processor 100 may consult an electronic database of information concerning the capabilities of various intelligent cooking appliances 124 in connection with the extracted preparation directions. The database 124 may be used to identify intelligent or human-operated cooking appliances that are suitable for use in the preparation of the recipe. For example, the recipe processor 100 may modify the preparation directions to specify an appliance (e.g., a toaster oven, a microwave, etc.) before supplying the preparation directions to a human operator. The recipe processor 100 may also identify one or more intelligent appliances that are capable of independently performing steps of the recipe before transforming at least some of the extracted preparation directions into machine-executable instructions that are formatted for execution by those identified intelligent appliances.

Based on the type of instruction based text patterns identified, the patterns may be correlated with entries describing intelligent appliances to identify and recommend devices for the preparation of the recipes. For example, a direction to "boil water" would require an electric water heater along with instructions to boil water for a specific time.

The recipe processor 100 may also consult a store of customization information 128 that may include such items such as personal dietary preferences, languages understood by the user, an inventory of ingredients on hand, etc. The recipe processor 100 may use that information to customize the preparation directions 132 before providing them to the user or the machine-executable instructions before providing them to an intelligent appliance for execution. For example, the processor 100 may substitute coconut milk in a recipe that calls for cream for a user whose customization information 128 specifies that they are lactose intolerant. In the event of translating the recipe content to another language, keyword tracking and precedence order are utilized to maintain context and the order of the action items in the recipe.

Having extracted human-friendly preparation directions from the recipe text, the recipe processor 100 may use a user interface such as a tablet or a text-to-speech generator to provide the preparation directions to a user. The supplied preparation directions may include the recipe content as well as information concerning various intermediate stages of the cooking process such as temperature, colour of the dish, smell, etc. which can help the user to confirm that the cooking process is proceeding as expected.

The recipe processor 100 may also use a user interface to receive real-time feedback from a user such as color, smell, time, etc. to determine whether the user has successfully or unsuccessfully completed various stages of the recipe and in response provide alternate instructions to prepare the recipe to correct any mistakes or errors committed in the course of preparing the recipe.

Figure 2:
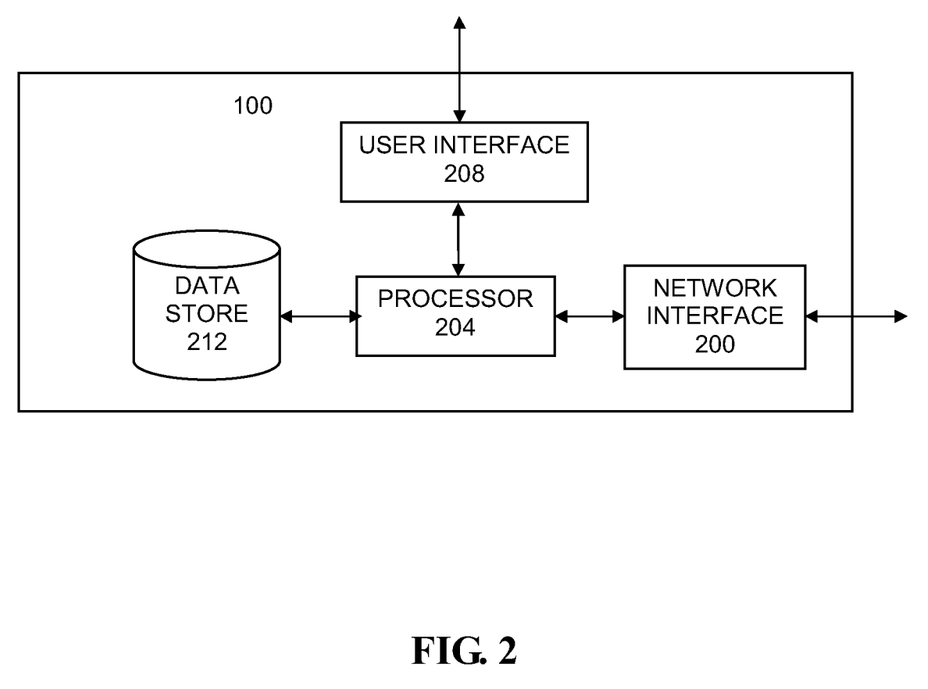
FIG. 2 depicts the recipe processor 100 of FIG. 1 in more detail.

FIG. 2 describes the recipe processor 100 in additional detail. As discussed above, the recipe processor 100 can take various forms, physical and virtual, but most implementations will share certain common functionalities. The network interface 200 allows the recipe processor 100 to receive communications from other devices and, in one embodiment, provides a bidirectional interface to the Internet. Suitable network interfaces 200 include gigabit Ethernet, Wi-Fi (802.11a/b/g/n), and 3G/4G wireless interfaces such as GSM/WCDMA/LTE that enable data transmissions between recipe processor 100 and other devices. A processor 204 generates communications for transmission through the interface 200 and processes communications received through the interface 200 that originate outside the recipe processor 100. A typical processor 204 is an x86, x86-64, or ARMv7 processor, and the like. The user interface 208 allows the recipe processor 100 to receive commands from and provide feedback to an operator. Exemplary user interfaces include graphical displays, physical keyboards, virtual keyboards, etc. The data store 212 provides both transient and persistent storage for data received via the interface 200, data processed by the processor 204, and data received or sent via the user interface 208.

The interface 200 of the recipe processor 100 is configured to handle communications with various data sources and appliances. The recipe processor 100 retrieves data from such sources as structured sources of recipe content 108, sources of transcribed text 120, databases of appliance information 124, stores of customization information 128, etc. Some embodiments of the recipe processor 100 also engage in bidirectional communications with these sources. The recipe processor 100 also uses its interface 200 to communicate with appliances equipped with interfaces to receive machine-executable instructions, as discussed below.

The recipe processor 100 also utilizes its storage 208 to hold a library of pre-defined text patterns 104, identified text patterns related to instructions 112, machine-executable instructions 116, customization information 128, and customized preparation directions 132.

Figure 3:
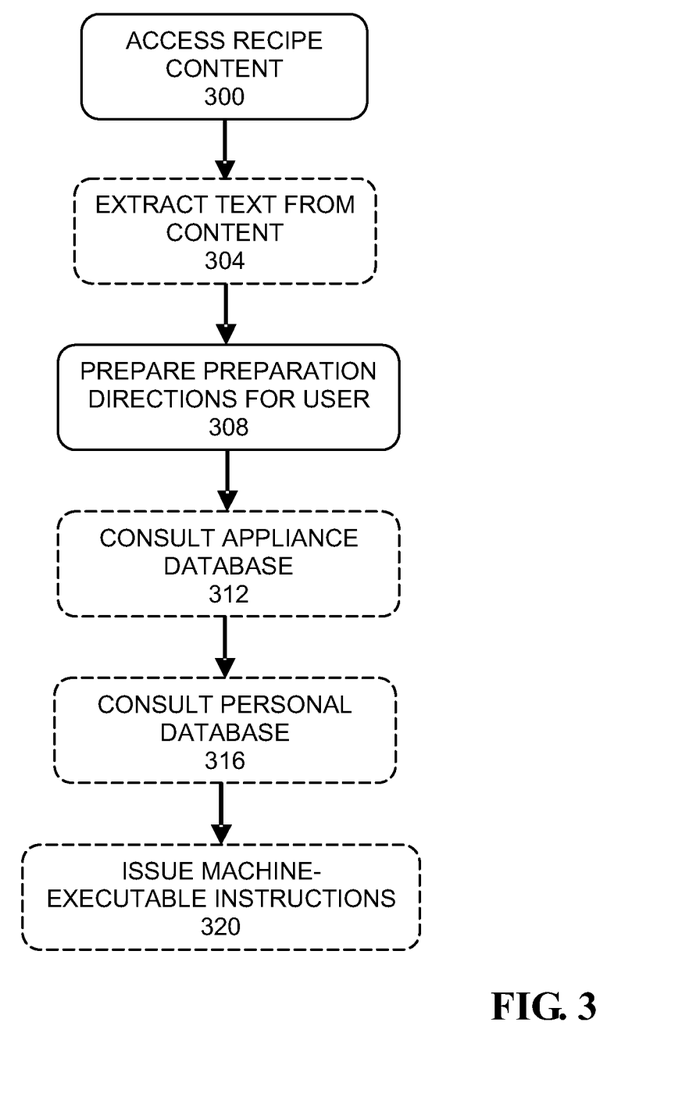
FIG. 3 is a flowchart of a method for recipe management in accord with the present invention.

With reference to FIG. 3, embodiments of the present invention may also take the form of a method for recipe management. The method may be implemented as a program executing on a single computing device such as a personal computer or cellphone, a dedicated computing appliance having the method stored in a fixed memory, a program executing across multiple computing devices, etc.

The process begins by accessing content (Step 300). The cooking content may be stored in a local memory such as a Winchester disk drive or accessible by way of some form of network interface, such as an Internet connection. Suitable forms of cooking content include webpages, blog entries in text form, video blog entries, multimedia files, streaming multimedia, etc. The cooking content may be structured and accessible using APIs (application programming interfaces), or presented in a form intended for consumption by a human being. When the recipe content is structured, it may be made available in the form of preparation directions and/or machine-executable instructions, thereby obviating the need to extract the preparation directions from the cooking content and/or the need to create machine-executable instructions for intelligent cooking appliances as discussed in further steps of this process.

If the content does not include text, then text is extracted from the received cooking content (Step 304). Items of cooking content available in spoken form may be preprocessed using speech recognition technologies known to the art, such as neural networks, hidden Markov models, and dynamic time warping, resulting in transcribed text that may be processed as discussed below. Items of video content may also be preprocessed using speech recognition technologies or, in the event that the items include closed captioning, the closed captioning text may be processed as discussed below or it may be used to inform the speech recognition process, resulting in transcribed text for further processing.

Given textual cooking content, preparation directions suitable for a human operator may be extracted from the content (Step 308). In one embodiment, the extraction process may access a library of pre-defined text patterns and use those stored patterns to analyze the textual cooking content. For example, the natural language content may be searched for text patterns from the library of pre-defined text patterns using natural language processing (NLP) techniques such as verb-phrase extraction and intelligent text parsers. The sequence of the occurrence of the instructions in the text typically indicates the sequence of the occurrence of the preparation directions. Specific patterns such as temperature and quantity of the ingredients are extracted using specific regular expressions curated and stored in a data store.

Each pre-defined pattern may be associated with human-understandable preparation directions and machine-executable instructions. For example, one pattern may be "cook over low heat" which is associated with the human-understandable preparation direction, "Turn the burner under the pan to 'low'" and the machine-executable instruction, "Set burner <1> to <2>." When such a pattern is identified, any associated preparation directions and machine-executable instructions are added to a stored memory for later delivery to a user or an intelligent cooking appliance. As discussed below, in one embodiment these items are added to a recipe graph, although other data structures may be used for storing preparation directions and machine-executable instructions.

Having processed the textual recipe content, an electronic database of information describing the capabilities of various intelligent cooking appliances may be consulted in connection with the extracted preparation directions (Step 312). The database may be used to identify intelligent or human-operated cooking appliances that are suitable for use in the preparation of the recipe. For example, the preparation directions may be modified to specify an appliance (e.g., a toaster oven, a microwave) before supplying the preparation directions to a human operator. One or more intelligent appliances that are capable of independently performing steps of the recipe may be identified before transforming at least some of the extracted preparation directions into machine-executable instructions that are formatted for execution by those identified intelligent appliances.

Based on the type of instruction based text patterns identified, the patterns may be correlated with entries describing intelligent appliances to identify and recommend devices for the preparation of the recipes. For example, a direction to "boil water" would require an electric water heater along with instructions to boil water for a specific time.

In the course of preparing preparation directions, a store of customization information may be consulted (Step 316) that may include such items such as personal dietary preferences, languages understood by the user, an inventory of ingredients on hand, etc. This information may be used to customize the preparation directions before providing them to the user or the machine-executable instructions before providing them to an intelligent appliance for execution. For example, coconut milk may be substituted in a recipe that calls for cream for a user whose customization information specifies that they are lactose intolerant. In the event of translating the recipe content to another language, keyword tracking and precedence order are utilized to maintain context and the order of the action items in the recipe.

Having extracted human-friendly preparation directions from the recipe text, a user interface such as a tablet or a text-to-speech generator may be used to provide the preparation directions to a user. The supplied preparation directions may include the recipe content as well as information concerning various intermediate stages of the cooking process such as temperature, colour of the dish, smell, etc. which can help the user to confirm that the cooking process is proceeding as expected. A user interface may also be used to receive real-time feedback from a user such as color, smell, time, etc. to determine whether the user has successfully or unsuccessfully completed various stages of the recipe and in response provide alternate instructions to prepare the recipe to correct any mistakes or errors committed in the course of preparing the recipe.

When one or more intelligent appliances have been identified to aid in recipe preparation, then machine-executable instructions may be issued to those appliances for execution (Step 320). Those instructions may be issued in an appliance-specific format specified in the database of appliance information.

For example, the machine-executable instructions can be of binary, JSON, XML, or any other industry-used or proprietary format. The machine-executable instructions can be transmitted to the device over various communication channels such as Wi-Fi, Ethernet, Bluetooth, BT-LE, NFC, etc. The instructions can transmitted locally, when the appliance and the sending device are in the same node, or remotely, when the machine receiving the instructions and the sending device are in different nodes.

Figure 4:
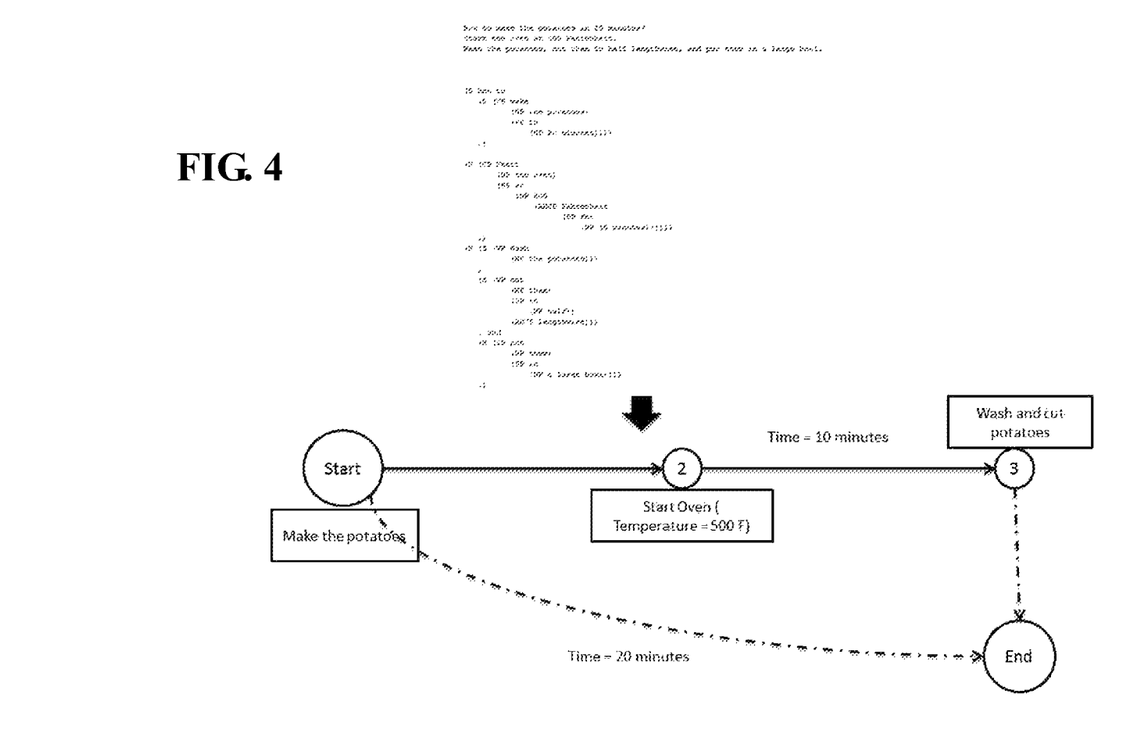
FIG. 4 is an illustration of an exemplary recipe graph resulting from the processing of recipe content in accord with the present invention.

FIG. 4 presents an example of a recipe graph data structure resulting from the processing of recipe content. In this example, recipe content concerning the preparation of potatoes has been retrieved as discussed above. The recipe content is parsed into individual sentences, each of which is a top-level entry in the resulting parser output. Each sentence is, in turn, parsed into a collection of verb phrases, adjectival phrases, noun phrases, etc., using parsing methods known to one of ordinary skill. These phrases are stored in a tree-like structure, with a verb phrase typically forming the root of the structure and the other phrases in the sentence forming leaves in the structure.

The parser output is then converted to a recipe graph in accord with the present invention. Each sentence is assigned to a node in the graph, and links are established between nodes such that order of nodes in the graph roughly corresponds to the order of the sentences in the parsed recipe content. The individual verb phrases, etc. of the sentence are established as conditions associated with a node that are to be satisfied before transitioning to the next node.

In some embodiments, the recipe graph structure may be used by embodiments of the present invention to prepare the food according to the recipe content. The graph structure may be treated as a state machine, with the system beginning at the start node in the structure. The system reviews the conditions and instructions associated with the start node and issues appropriate machine-executable instructions and human-understandable directions reflecting the associated conditions and instructions. The system awaits automated feedback indicating that the machine-executable instructions have been fulfilled, and manual feedback from the human operator indicating that the human-understandable directions have been met.

When the feedback indicates that the conditions and instructions have been fulfilled, the system advances down the link to the next state in the graph and repeats the process, issuing instructions and directions and awaiting feedback indicating that the instructions and directions are met before advancing to the next node, until the end state in the graph is met, at which point the assumption is that the food has been prepared.

Embodiments of the present invention can retrieve content comprising natural language communications in real time, on an as needed or as directed basis, or the content can be retrieved and stored in advance of its use, either as directed by a user or in preparation for later use. For example, an embodiment of the invention can be used to prepare a library of recipes that may be executed, at least in part, by one or more intelligent appliances and delivered in stored form as a dedicated appliance or otherwise for later usage.

As will be apparent from the foregoing description, the present invention presents several aspects that are advancements over prior art techniques. In one aspect, the proposed systems and methods use closed caption text of videos from online resources to identify preparation directions using, e.g., text patterns, which are interpreted and translated into instructions for one or more cooking devices, automated or otherwise. In another aspect, the proposed systems and methods use natural language processing and other similar techniques to extract text from audio content before identifying preparation directions and device instructions. In still another aspect, the proposed systems and methods, having extracted preparation directions, may recommend a list of cooking appliances, either intelligent or otherwise, for preparing the recipe at issue; offer suggestions of recipes to avoid or steps to take to correct mistakes while preparing a recipe; offer substitutions to personalize the content of the recipe to account for e.g., cultural preferences, dietary requirements, differences in language used, etc.; and assist the user with the visualization of the content by displaying user directions via a user interface (such as a tablet device) while coordinating the operation of various automated cooking devices to execute the preparation of the recipe.

Embodiments of the present invention lend themselves to several desirable applications.

For example, embodiments of the present invention can be used to transform the process of broadcasting cooking content. A broadcast provider or Internet content provider shooting a recipe video or cooking show can utilize an embodiment of the present invention to automatically transcribe the spoken audio accompanying the video content. Once the spoken content is transcribed, the embodiment proceeds to automatically extract the recipe content from the transcription based on, e.g., a pre-constructed ontology. The extracted recipe content can then be analyzed to extract verbs, instructions, times, temperatures, pre-conditions, post-conditions, etc., and automatically generate an executable recipe graph from that information. Appropriate nodes within the graphs are converted into executable machine-executable instructions for one or more remotely-operable appliances. The recipe graph can be converted into different languages or converted to use different ingredients utilizing a multi-lingual dictionary or a dictionary of ingredient substitutions.

Another useful application would be the automatic adaptation of recipes for dietary considerations. For example, individuals having high blood pressure interacting with embodiments of the present invention could see salt in an ingredient list highlighted with color coding, or automatically make an appropriate substitution for the salt in the recipe. Similarly, patients with diabetes interacting with embodiments of the present invention could have certain ingredients in a recipe substituted utilizing a dictionary of ingredient substitutions or a substitution ontology.

Another useful application involves recipe "recovery" or "repair" when ingredients or steps in a recipe are missed or ignored. In this use case, the executable recipe graph can be used to save the recipe by providing users with guidance and alternatives. For example, if too much salt is added, then salt-absorbing ingredients can be suggested and alternatives to other ingredients can be recommended by using a dictionary of ingredient substitutions or a substitution ontology.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. An apparatus for recipe management, the apparatus comprising:
   a network interface configured to receive at least one communication comprising natural language concerning the preparation of food or drink;
   a persistent memory for storage, and
   at least one processor arranged to:
   receive from the network interface the at least one communication comprising natural language concerning the preparation of food or drink,
   pre-process, with assistance from a speech recognition processor, the at least one received communication, in the case where the at least one communication comprises video content including closed captioning text resulting in pre-processed transcribed text,
   pre-process the at least one received communication comprising video content using speech recognition to extract text from said received communication, in the case where the at least one received communication is sourced from at least one source of cooking content comprising spoken language,
   extract at least one preparation direction from the at least one received communication;
   customize certain preparation directions from among the at least one preparation direction prior to providing the at least one preparation direction to the user;
   identify from a database of information describing capabilities of various intelligent cooking appliances, one or more intelligent appliances capable of independently performing steps of a recipe prior to transforming at least some of the extracted preparation directions into machine-executable instructions that are formatted for execution by said identified intelligent appliances, transform the at least one extracted preparation direction into at least one machine-executable instruction in the case where said one or more intelligent appliances have been identified as capable of independently performing the at least one extracted preparation direction;

provide the at least one extracted preparation direction directly to the user in the case where said one or more intelligent appliances capable of independently performing steps of said recipe cannot be identified at said identification step, receive from the network interface, real-time feedback from a user including color, smell and time responsive to supplemental information provided to the user at various intermediate stages of the cooking process to determine whether the user has successfully or unsuccessfully completed various stages of the recipe, wherein said supplemental information is provided as a supplement to the at least one extracted preparation directions; and provide alternate instructions to the user to prepare the recipe to correct mistakes and/or errors committed in the course of preparing the recipe, responsive to said user feedback.

2. The apparatus of claim 1 wherein the at least one processor is further arranged to transmit at least one communication comprising the at least one machine-executable instruction to the network interface, and the network interface is further configured to transmit the at least one communication comprising the at least one machine-executable instruction.

3. The apparatus of claim 1 wherein the at least one processor is further arranged to receive at least one customization instruction and store said at least one customization instruction in the persistent memory.

4. The apparatus of claim 3 wherein the at least one customization instruction is one or more of a dietary requirement and an ingredient substitution.

5. The apparatus of claim 1 wherein the at least one communication comprising natural language comprises spoken language, and the at least one processor is further arranged to convert the spoken language to text.

6. The apparatus of claim 5 wherein the at least one processor is further arranged to extract at least one preparation direction from the at least one received communication comprising spoken language using natural language processing.

7. The apparatus of claim 1 wherein the persistent memory comprises information describing the capabilities of at least one appliance, and the at least one processor is further arranged to compare the at least one extracted preparation direction against the information describing the capabilities of at least one appliance to identify at least one appliance for preparing food or drink in accordance with the at least one extracted preparation direction.

8. The apparatus of claim 1 further comprising a user interface for providing at least one direction concerning the preparation of food or drink in accordance with the at least one extracted preparation direction.

9. The apparatus of claim 1 further comprising a user interface for receiving feedback from the user concerning the preparation of food or drink.

10. The apparatus of claim 1 wherein the persistent memory comprises preparation information describing food or drink preparation, and the processor is further arranged to use the preparation information to make corrections or adaptations to the at least one extracted preparation direction.

11. A method for recipe management, the method comprising:

receiving, via a network interface, at least one electronic communication comprising natural language concerning the preparation of food or drink, wherein the at least one electronic communication is sourced from at least one source of audio and video cooking content, said at least one source comprising transcribed text from a transcription of said content based on a pre-constructed ontology;

utilizing at least one processor arranged to:

automatically extract at least one preparation direction from the at least one received natural language communication; and identify from a database of information describing capabilities of various intelligent cooking appliances, one or more intelligent appliances capable of independently performing steps of a recipe prior to transforming at least some of the extracted preparation directions into machine-executable instructions that are formatted for execution by said identified intelligent appliances, provide the at least one extracted preparation direction directly to the user in the case where said one or more intelligent appliances capable of independently performing steps of said recipe cannot be identified at said identifying step, transform the at least one extracted preparation direction into at least one machine-executable instruction in the case where said one or more intelligent appliances have been identified as capable of independently performing the at least one extracted preparation direction, customize certain preparation directions from among the at least one preparation direction prior to either transforming the at least one extracted preparation direction into at least one machine-executable instruction in the case where one or more appliances have been identified as capable of independently performing the at least one extracted preparation direction, provide the at least one extracted preparation direction directly to the user, via the at least one configured processor, in the case where one or more appliances have not been identified as capable of independently performing the at least one extracted preparation direction, and receive via the network interface, real-time feedback from a user including color, smell and time responsive to supplemental information provided to the user at various intermediate stages of the cooking process to determine whether the user has successfully or unsuccessfully completed various stages of the recipe, and provide alternate instructions to prepare the recipe to correct mistakes and/or errors committed in the course of preparing the recipe, responsive to said user feedback.

12. The method of claim 11 further comprising transmitting, using the network interface, the at least one machine-executable instruction.

13. The method of claim 11 further comprising receiving at least one customization instruction and storing the at least one customization instruction in a persistent memory.

14. The method of claim 13 wherein the at least one customization instruction is one or more of a dietary requirement and an ingredient substitution.

15. The method of claim 11 wherein the at least one electronic communication comprising natural language comprises spoken language, and further comprising converting, utilizing the at least one configured processor, the spoken language to text.

16. The method of claim 15 wherein the at least one preparation direction is extracted, utilizing the at least one configured processor, from the at least one received communication comprising spoken language using natural language processing.

17. The method of claim 11 further comprising comparing the at least one extracted preparation direction against information describing the capabilities of at least one appliance stored in a persistent memory to identify at least one appliance for preparing food or drink in accordance with the at least one extracted preparation direction.

18. The method of claim 11 further comprising providing, utilizing a user interface, at least one direction concerning the preparation of food or drink in accordance with the at least one extracted preparation direction.

19. The method of claim 11 further comprising receiving, utilizing a user interface, feedback from the user concerning the preparation of food or drink.

20. The method of claim 11 further comprising utilizing preparation information stored in a persistent memory describing food or drink preparation to make corrections or adaptations to the at least one extracted preparation direction.

21. An apparatus for recipe management, the apparatus comprising:
a network interface configured to receive at least one communication comprising natural language concerning the preparation of food or drink;
a persistent memory for storage, and
at least one processor arranged to:
receive from the network interface the at least one communication comprising natural language concerning the preparation of food or drink wherein the at least one communication is sourced from a structured source of recipe content in the form of preparation directions and/or machine-executable instructions,
extract at least one preparation direction from the at least one received communication;
consult said communication sourced from a store of customization information to retrieve one or more languages understood by the user;
identify from a database of information describing capabilities of various intelligent cooking appliances, one or more intelligent appliances capable of independently performing steps of a recipe prior to transforming at least some of the extracted preparation directions into machine-executable instructions that are formatted for execution by said identified intelligent appliances,
transform the at least one extracted preparation direction into at least one machine-executable instruction in the case where said one or more intelligent appliances have been identified as capable of independently performing the at least one extracted preparation direction; and
provide the at least one extracted preparation direction directly to the user in the case where said one or more intelligent appliances capable of independently performing steps of said recipe cannot be identified at said identification step,
receive from the network interface, real-time feedback from a user including color, smell and time responsive to supplemental information provided to the user at various intermediate stages of the cooking process to determine whether the user has successfully or unsuccessfully completed various stages of the recipe, and
provide alternate instructions to the user to prepare the recipe to correct mistakes and/or errors committed in the course of preparing the recipe, responsive to said user feedback,
customize certain preparation directions from among the at least one preparation direction prior to providing the at least one preparation direction to the user including translating said preparation directions to a language understood by the user before providing them to the user and/or the machine-executable instructions before providing them to an intelligent appliance for execution; and
the apparatus further comprising a persistent memory for storage.

22. The apparatus of claim 21 wherein said processor is further arranged to translate said recipe content to said one or more languages determined to be understood by the user, utilizing keyword tracking and precedence order to maintain context and an order of action items in the recipe.

23. The apparatus of claim 21, wherein the structured source of recipe content in the form of preparation directions and/or machine-executable instructions is accessible using application programming interfaces (APIs).

* * * * *